May 6, 1958
A. L. KOHL ET AL
2,833,527
LIQUID AND GAS CONTACTING COLUMNS
AND THEIR TRAY STRUCTURES
Filed June 6, 1955
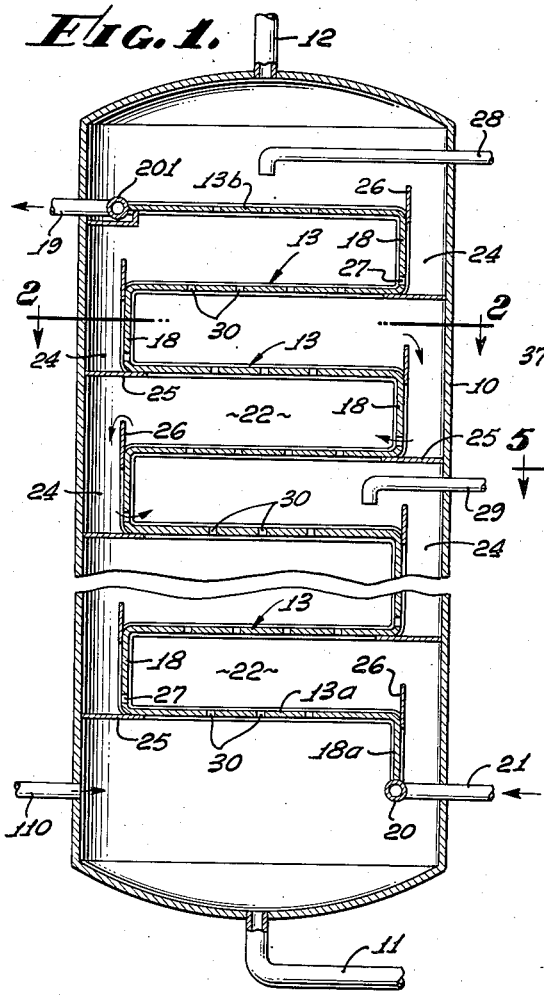
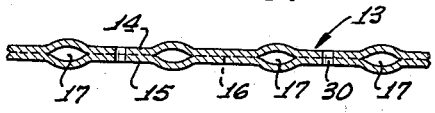
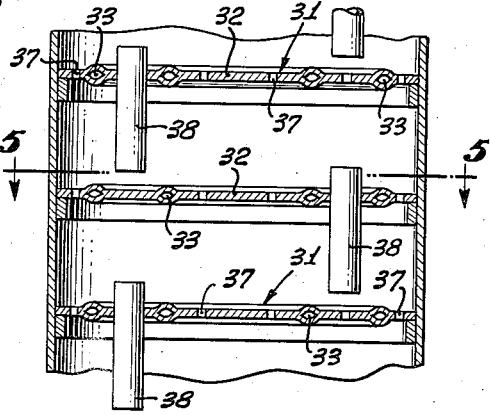
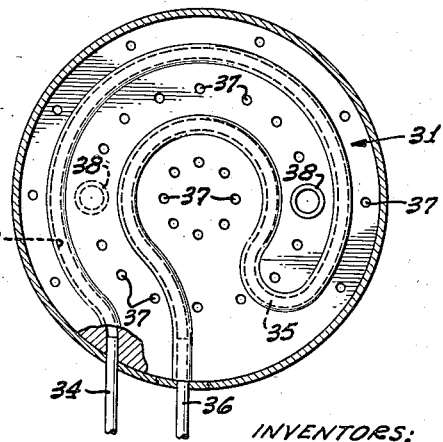
INVENTORS:
ARTHUR L. KOHL
RICHARD S. DE WOLFE
ROBERT L. SOLNICK
BY
ATTORNEY.

United States Patent Office 2,833,527
Patented May 6, 1958

2,833,527

LIQUID AND GAS CONTACTING COLUMNS AND THEIR TRAY STRUCTURES

Arthur L. Kohl, Whittier, Richard S. De Wolfe, La Canada, and Robert L. Solnick, Whittier, Calif., assignors to The Fluor Corporation, Ltd., Los Angeles, Calif., a corporation of California Application June 6, 1955, Serial No. 513,208

3 Claims. (Cl. 261—11)

This invention relates to improvements in liquid and gas or vapor contacting columns useable for any of such various purposes as rectifiers, fractionating columns, stills, absorbers and the like. In their general construction such columns comprise a vertical shell containing series of trays over which liquid passes downwardly in contact with gas rising within or through the trays, the gas being withdrawn from the top of the column and the liquid from its base.

The invention is more particularly concerned with improvements in such columns designed for indirect heat exchange between a confined heating or cooling fluid with the liquid on one or more of the trays. In the past it has been customary to place tubes in coiled or otherwise assembled form on the trays, and to employ header connections outside the shell for passing the cooling or heating fluid serially or selectively through the different tray tube assemblies, or to have the heat exchangers external to the column, withdrawing fluid from the column for heating or cooling and readmitting same to the column. Accordingly, the conventional practices have necessitated separate fabrication of the trays and tube coils, and manifolding piping in accordance with the number and relation of trays carrying the tube coils.

The present invention has for one of its major objects to provide a novel tray construction so designed and fabricated that the heating or cooling fluid is circulated within the generally sheet form or structure of the tray itself, as distinguished from an independent coil or tube arrangement supported on or directly above the tray. Thus, whereas the transference of heat in the usual manner between the liquid on a tray and a conventional pipe coil, occurs independently of and can result from no heating or cooling of the tray itself, the invention permits heat transmission between the liquid and the metal tray itself through the liquid-tray interface and across the entire area of the tray and also to the vapor below the tray. As will appear, the invention is applicable to the provision for internal cooling or heating of individual trays, with or without interconnections or manifolding outside the column, or to the formation of a series of trays so interconnected by a continuance of the tray forming sheet material, as to provide for series flow interconnections entirely within the column, between several trays.

In its more specific aspects, the invention is directed to the formation of trays for liquid and gas contacting columns, using superposed metal sheets which are pressure bonded to a state of integration throughout one portion of the sheet area, the sheets being unbonded at their interfaces throughout the extent of one or more heating or cooling fluid passages which are formed by internal pressure expansion of the sheets at the predetermined location of the passage or passages between them. For further details concerning methods and materials useable to pressure bond metal laminations with fluid passages formed between them, reference may be had to Patent No. 2,690,002, issued September 28, 1954, to L. H. Grenell.

Contemplated also is a novel tray structure so formed as to accomplish distributed flow of gas upwardly through the tray into the liquid thereon, by openings positioned in the tray in off-set relation to the heating or cooling fluid passages, the form and distribution of the openings being variable in accordance with different specific tray designs. Typically the gas-passing openings may have the form of relatively small size perforations uniformly distributed throughout areas of the pressure bonded portions of the composite tray-forming sheet, between the fluid passages.

The above-mentioned features and objects of the invention, as well as various additional details such as overflow pipe or weir arrangements applicable to different specific tray designs, will be understood more fully from the following detailed description of the illustrative embodiment shown by the accompanying drawing, in which:

Fig. 1 is a view showing in vertical section a liquid and gas contacting column containing interconnected trays of the continuous series design referred to above;

Fig. 2 is a cross-section on line 2—2 of Fig. 1;

Fig. 3 is an enlarged fragmentary cross-section on line 3—3 of Fig. 2;

Fig. 4 is a view showing in fragmentary vertical section a column containing a variational form of tray structure; and Fig. 5 is a cross-section on line 5—5 of Fig. 4.

Referring first to Fig. 1, the shell 10 may be regarded as typical of any suitable form of liquid and gas contacting column which, for example, may have a gas inlet 110, bottom liquid draw-off line 11 and top vapor gas outlet 12. The column contains a series of vertically spaced trays generally indicated at 13 square or rectangular in plan, as viewed in Fig. 2, and interconnected for series flow of a heating or cooling fluid through them, as will presently appear. As shown in Fig. 3, the trays are formed of a pair of superposed sheets 14 and 15, made for example of an aluminum alloy. The sheets 14 and 15 are pressure bonded together in the plane represented by the broken line 16, which originally had been the interface between the sheets, by the application to the sheets of pressures of such magnitude as to fuse the sheets together at the interface 16 to a condition of such integration that the pressure bonded composite is completely homogeneous and shows no delineation at the interface. Each tray is shown to contain internal passages 17 which, in accordance with fabrication techniques of the kind dealt with in the Grenell patent mentioned hereinabove, may be formed by masking the interfaces of the laminations 14 and 15 at the location of the passages, with coating material which in the process of pressure bonding together the laminations, prevents their cohesion at the location of the passages. After bonding together the laminations between the passage locations, the passages 17 themselves are formed into the expanded condition illustrated, by the introduction of fluid under such high pressure as to bulge the laminations and thus enlarge the passage areas to the extent required for the free flow of fluid therethrough.

The tray series may be formed as a unit and from a continuous sheet of the pressure bonded laminations 14 and 15, the composite sheet having the general form of a ribbon doubled upon itself as shown in Fig. 1 to form vertically extending portions 18 alternately at opposite sides of the horizontal tray portions 13. Passages 17 thus extend longitudinally within the entire tray-forming ribbon, and continuously through the tray portions 13 and the interconnecting vertical portions 18, so that heating or cooling fluid introduced through line 21 into head 20 which connects with passages 17 opening through the bottom tray 13a and 18a, may flow upwardly through all the trays into a top header 201 connecting with the passages in the uppermost tray 13b and thence into discharge line 19.

Referring to Fig. 2, the spaces at 22 between opposite sides of the trays 13, are closed by plates 23 welded or otherwise sealed to the shell and edges of the trays. Similarly the spaces at the bottoms of the downflow passages 24, see Fig. 1, are closed by plates 25. Each of the trays 13 carries an upstanding weir 26 which extends horizontally to the shell wall, the purpose of which is to maintain on the trays a minimum liquid level corresponding to the weir elevation above the tray. Liquid overflowing the weir gravitates through passages 24 and openings 27 in the tray forming sheet, positioned closely above the tray surface and between the passages 17. Liquid to be carried by the trays may be present in the column from any of various possible sources, such as by introduction through one or more inlet lines 28 and 29. As will be understood from the foregoing, liquid introduced to the top of the column flows across the trays alternately in opposite directions in the course of its travel over the weir 26 into the down passages 24 and thence through openings 27 onto the tray surfaces, the liquid finally discharging into the bottom of the shell for withdrawal through line 11.

Gas introduced to the bottom of the column through line 10, as well as any gases or vapors liberated from the liquid on the trays, flow upwardly in generally counter-current relation to the down-flowing liquid, through perforations 30 extending through the tray sheets in offset relation to the passages 17. Depending upon such considerations as the design capacity of the column, the perforations 30 may be provided in such number, size and arrangement as will afford generally distribution of the rising gas within the liquid carrying area of the trays 13.

Figs. 4 and 5 illustrate a variational form of the invention in which the trays, generally indicated at 31, are formed individually or separately, and contain internal passages through which heating or cooling fluid may be supplied through connections leading to the outside of the column. Here each of the trays is shown to consist of a circular plate 32 formed by pressure bonding of metal sheets in essentially the same manner described with reference to Fig. 3, the plate containing a fluid passage 33 which may have any of various shapes and extents so as to effect generally uniform heat transfer conditions across the area of the plate. As shown in Fig. 5, the passage 33, to which fluid is supplied through line 34, may extend circularly within the plate, reversing itself at 35 in continuing to the outlet connection 36. As will be understood without necessity for further illustration, the lines 34 and 36 as provided for the individual trays, may be interconnected by any suitable manifolding arrangement, depending upon the number and relation of the trays requiring heating or cooling. As before, liquid on the trays is contacted with rising gas or vapor streams passing through perforations 37 located in the plate between and at the outside of passages 33. The liquid on each of the trays overflows onto the tray below by a suitable arrangement of passages typified by the overflow pipes 38, the particular form, number and arrangement of which may be varied in accordance with known practices in the art, of which the representation of simple overflow pipes at 38 is to be regarded as illustrative only.

We claim:

1. A liquid and gas contacting column, comprising a vertically extending shell, means for introducing a liquid into the upper end of said shell to fall downwardly therethrough, means for passing a gas upwardly through the shell to intimately contact the liquid, a tray structure in the shell formed of a pair of superposed metal sheets in the shell bonded integrally together at localized areas and deformed to form a series of vertically spaced horizontal fluid contacting trays in the shell on which the liquid accumulates as it falls downwardly through the shell, said bonded sheets being deformed to first extend horizontally near the upper end of the shell to form a first of said trays, then extend vertically downwardly near a first side of the shell, then extend horizontally toward a second and opposite side of the shell to form a second tray spaced beneath the first, then extend downwardly at that second side of the shell, and then continue with similar alternate horizontal tray portions and connecting vertical extents throughout said entire series of trays, said two metal sheets forming between them a plurality of spaced essentially parallel heat exchange fluid conducting passages extending continuously within said alternate horizontal and vertical extents of the sheets, the vertical extents of the metal sheets being spaced from the adjacent side walls of the shell to form therewith downspaces through which the liquid may fall downwardly from the level of one tray to the level of the next tray, weir plates projecting above the upper surface levels of said trays at the locations of said vertical extents of the sheets and preventing flow of said liquid from one tray into the adjacent downspace until the liquid reaches a predetermined level overflowing the weir, the space between each tray and the shell wall being essentially closed against liquid downflow therethrough except at the location of the associated downspace and weir, essentially horizontal walls closing off the bottoms of said downspaces at a location preventing the liquid in each of said downspaces from falling downwardly therein past approximately the level of the next successive tray, the vertical extents of said sheets containing openings which extend through the sheets at locations offset from and isolated from said passages and through which liquid may flow from each of said downspaces onto the next successive horizontal tray formed by the sheets, the horizontal tray-forming portions of the sheets containing openings extending therethrough at locations offset from and isolated from said passages between the sheets and of a size for passing gas upwardly through the trays and into liquid standing thereon while holding liquid on the trays against downflow through said openings, said two metal sheets being integrally bonded together adjacent the locations of said openings in both the vertical and horizontal extents thereof to isolate the passages against communication with the liquid and gas flowing through said openings.

2. A liquid and gas contacting column as recited in claim 1, in which said shell is cylindrical, and said vertical sheet portions extend chordwise of the shell.

3. A liquid and gas contacting column as recited in claim 1, including inlet and outlet ducts extending between upper and lower ends of said passages and the outside of the shell.

References Cited in the file of this patent

UNITED STATES PATENTS

| | | |
|---|---|---|
| 710,974 | Hirzel | Oct. 14, 1902 |
| 1,723,659 | Rosenquist | Aug. 6, 1929 |
| 2,292,350 | Brandt | Aug. 11, 1942 |
| 2,458,629 | Orley | Jan. 11, 1949 |
| 2,514,469 | Burkhardt | July 11, 1950 |
| 2,690,002 | Grenell | Sept. 28, 1954 |

FOREIGN PATENTS

| | | |
|---|---|---|
| 630,884 | Great Britain | Oct. 24, 1949 |
| 885,548 | France | May 31, 1943 |